(12) United States Patent
Hubrecht

(10) Patent No.: US 7,370,783 B2
(45) Date of Patent: May 13, 2008

(54) DEVICE FOR SEPARATING STACKED SHEETS

(75) Inventor: Leonard Hubrecht, Hertsberge (BE)

(73) Assignee: Technologia Del Carton, S.A. (ES)

( * ) Notice: Subject to any disclaimer, the term of this patent is extended or adjusted under 35 U.S.C. 154(b) by 302 days.

(21) Appl. No.: 10/524,884

(22) PCT Filed: Aug. 20, 2002

(86) PCT No.: PCT/ES02/00406

§ 371 (c)(1),
(2), (4) Date: Mar. 16, 2005

(87) PCT Pub. No.: WO2004/018169

PCT Pub. Date: Mar. 4, 2004

(65) Prior Publication Data

US 2006/0151937 A1    Jul. 13, 2006

(51) Int. Cl.
*B26F 3/02* (2006.01)
(52) U.S. Cl. ........................ 225/101; 225/103
(58) Field of Classification Search ............... 225/96.5, 225/100, 101, 103, 104, 2; 493/340, 363
See application file for complete search history.

(56) References Cited

U.S. PATENT DOCUMENTS 4,136,604 A * 1/1979 Schmidt ............... 493/340
5,791,539 A * 8/1998 Shill et al. ............... 225/96.5
6,019,267 A * 2/2000 Shill et al. ............... 225/101
6,655,566 B1 * 12/2003 Martin et al. ............ 225/101
6,776,748 B2 * 8/2004 Joux ........................ 225/101

FOREIGN PATENT DOCUMENTS

EP    0509153    * 10/1992

* cited by examiner

*Primary Examiner*—Stephen Choi
(74) *Attorney, Agent, or Firm*—Ostrolenk, Faber, Gerb & Soffen, LLP

(57) ABSTRACT

The separator is based on the mounting of two moveable frames (2) and (2') on a fixed lower structure (1), mounting corresponding conveyor belts (3) and (3') being mounted between these frames (2) and (2'), each of which passes between a pair of rollers (5-6) and (5'-6'), respectively, the rollers (6) and (6') of both conveyor belts (3) and (3') remaining close to each other, all of this in a such way that the blocks (33) and (33') delimited along pre-cut lines (32) corresponding to a series of stacked sheets (31) of cardboard, on being introduced into the separator and being supported in correspondence with the conveyor belts (3) and (3'), with the punched line (32) vertical and interpolated between the rollers (6) and (6'), the folding upwards of these, by means of a system arranged at the base, brings about the rupture of the punched lines (32) and the separation of the blocks (33) and (33'), these being held during the separation by retaining pads (18) corresponding with pressure mechanisms (8) mounted on the actual moveable frames (2) and (2').

6 Claims, 13 Drawing Sheets

B-B

C

DEVICE FOR SEPARATING STACKED SHEETS

PRIORITY CLAIM

This is a 35 U.S.C. §371 National Stage of International Application No. PCT/ES2002/000406, filed on Aug. 20, 2002.

OBJECT OF THE INVENTION

The present invention refers to a stacked sheet separator, specifically applicable in machines that receive piles of punched sheets intended for the manufacture of compact cardboard boxes, to carry out the separation of each block of sheets with respect to the rest that form the pile.

The object of the invention is to provide the manufacturers of cardboard boxes, and in general the sector entrusted with handling and separating two blocks of sheets or leafs joined along a punched line, to free one block from the other, and to be able to use the sheets of each block for their final purpose, such as being pieced together to form boxes or similar.

The separation of two blocks of stacked sheets is carried out by pivoting upwards the two surfaces that support both joined blocks, so that this upwards pivoting brings with it the sheet-to sheet separation of both blocks, with minimum rupturing effort.

BACKGROUND OF THE INVENTION

Cardboard sheet punching machines for the manufacture of boxes are part of the corrugated cardboard transformation industry, so that at the end of the line blocks of differing number of sheets, one on top of the other, are obtained.

It is usual in the manufacturing process of punched boxes that several boxes are obtained from a sheet, to benefit to the maximum from the surface area in every strike, where the sectors of the sheet from which the different boxes will be obtained are joined by small points, forming blocks when the sheets are stacked.

Therefore, it is necessary to separate the different blocks of a stack of sheets, after first breaking the joint lines between the sectors of each sheet, and therefore separating the blocks that form those sectors.

Block separators are known that logically give rise to greater productivity than when the separation of the sectors of each sheet is manually carried out, different types of separators being known.

Specifically in the Spanish invention patent number 522521, of the company Bobst, a system based on a hydraulic anchoring of one of the two blocks which forms the stack of sheets is described, in order that a tensile horizontal movement applied to this block brings about its separation with respect to the other, by tearing along the punched lines that join both blocks.

The system described in that invention patent presents a series of disadvantages, since on one hand great anchoring and separation pressure is required, due to the fact that all the sectors of the block have to be separated at the same time by traction, with respect to the other sectors that belong to the same sheet, which implies having to work at high pressures that cause damage in the cardboard.

Furthermore, the hydraulic activation for putting the system into operation requires undesirable maintenance by the clients.

Also the problem that is implied by the fact that the joining points have to be small to reduce the separation effort, causing problems in the corresponding stacker, should be added.

Another disadvantage that the above-mentioned separator presents, in that invention patent, consists of the fact that it is only capable of handling small stacks of sheets, with the consequent decrease in speed of the punching machine, to which it is necessary to add the inability of separating different types of shapes of sectors formed in the sheets.

For its part, in the French patent number 2514296, of Raymond Lucas, a machine is described equally intended to separate by tearing along corresponding pre-cut lines, the parts or sectors established in a series of stacked sheets, separation being carried out by displacement of one of the parts or blocks.

In the European patent 0292067, of the Pallmac company, the separation of the punched blocks of sheets is carried out by pressing downwards of one of the parts or blocks, that is, there is a pivot point, the input means of the sheets remaining fixed, the outgoing means pivoting and the pivoting being carried out in a downwards sense.

The disadvantages that this system presents consist in that the minimum length of the outgoing means must be the half of the width of the punching machine, in addition to which the corresponding anchoring plates, used to keep the incoming block fixed, are adjustable in the direction of advance, having a damping system to reduce differences in height in the blocks. Anchoring is carried out by using a number of columns that project at the bottom from between the conveyor belts the adjustment of the means of anchoring being carried out, so that it is only possible to tackle complex shapes by raising the upper part of the machine.

The fact that in this invention patent anchoring takes place from below, and with columns between the conveyor belts, does not allow the blocks to remain uniformly held over the entire surface, because of which damage occurs in them.

Finally, in relation to this invention patent, to state that during the separation of the blocks, the downwards pivoting from the outgoing medium until the work-line "breaks", with which the line of separated blocks must be taken outside the separator before the next separation, giving rise to significant loss of time.

Also German patents 1142293 and 235997 can be mentioned, relating also to separators for the purpose referred to previously.

Finally, the company Thermoguard Equipment Inc. uses systems based on related patents in which separation is carried out by means of two pairs of cylinders, one, of short stroke, placed at floor level, and another, of longer stroke, placed on the upper part of the machine, so that the blocks remain at mid-way between said two pairs of cylinders, those being separated about a pivot point that is far from the separation point.

The disadvantages that this system presents can be summarised as follows:

The location of the pivot point causes the effort necessary for separation to be very high.

The use of a hydraulic machine, with the disadvantages referred to.

The anchoring plates are not adjustable in the direction of forward movement, because of which it is not possible to separate complicated shapes.

It is necessary to withdraw the separated block to proceed with the next separation, with the corresponding loss of time.

DESCRIPTION OF THE INVENTION

The stacked sheets separator that is the object of the invention has been developed to solve all of the problems previously set out, being based in that separation is carried out by pivoting, where the pivot point is centrally placed and uses pneumatic means, all of this allowing the power and pressure necessary to carry out the separation to be reduced.

The fact that the anchoring plates include a damping system to be able to adapt itself to the different surfaces of the blocks, without producing damage in these, is also a new characteristic.

Also it has been envisaged that the aforementioned anchoring plates be longitudinally adjustable, which allows separation of blocks with complicated shapes to be carried out.

These and other characteristics, as well as the advantages, will be set out throughout the present description of the actual separator, which is fabricated from a framework with a fixed lower structure and an upper structure formed by two moveable frames; so that the fixed structure, capable of being fitted with wheels in order to be movable, is intended to hold the electrical panel and the pressing-down and pivoting system for the corresponding belt conveyors that move the stacked punched sheets, each one of them with two sectors so that the superposition of the sectors of said sheets form the blocks which it is intended to separate.

The structure above that previously referred to is formed by two mobile frames of similar configuration, placed parallel with each other, each of them having a triangular profile, every profile determined by two end frames joined by the corresponding crossbars, where those triangular frames are at right angle, so that the vertical part of the right angle is parallel to and near that of the other frame, whereas the horizontal part, that forms a right angle with the previous one, is the one that rests on the fixed structure.

In said moveable frames twin sets of conveyor belts are placed, one of the sets being incoming and the other outgoing, so that such belts are mounted between respective pairs of rollers, the exteriors being fixed, whereas the interior ones, near to each other, are those that will pivot and that will make the belt conveyors tilt, to carry out the separation of two blocks of the corresponding pile of sheets, since a block will remain on the incoming conveyor belt and another on the outgoing conveyor belt, in order that the pivoting of said belts brings about the tearing and separation of the two blocks along the punched line; which will be continuously carried out from unit to unit, which results in minimum effort to carry out the separation.

The belt conveyors, in addition to the end and fixed cylinders and the internal pivoting cylinders, have another two pairs of cylinders for tensing and guiding, between which the belt drive axles, for driving them by friction in the respective drive axles, are placed.

In the moveable frames, and near to its upper part, twin pressure mechanisms are mounted, formed by a number of frames joined by crossbars, with end plates, on which guiding rollers are mounted; so that said crossbars have means that allow their longitudinal movement to be carried out, by means of the activation of a handle that transmits the movement to the corresponding axle integrally attached to the crossbars by means of a number of gears and a slide fastener; all of which allows regulation of the positioning of said pressure mechanism to be carried out, and therefore it be possible to carry out the separation of blocks with complex shape.

The frames of said pressure mechanism have at their ends a number of lower hydraulic pistons whose activation brings about a displacement in height of the actual pressure mechanism, or, what is the same, of the support of the pressing parts, these being associated with an air chamber acting as a means of damping of the retaining pads corresponding to said pressure mechanism.

Evidently, the descent of the retaining pad elements will bring about the pressing of the stacked sheets, specifically at both sides of them, or, what is the same, at both sides of the punched lines that delimit each pair of blocks of those stacked sheets, these being secured by both zones, one at the incoming and another at the outgoing, to be able to afterwards carry out the separation of both blocks, when the upwards pivoting of the internal axles of both belt conveyors is carried out.

The pivoting system is based on the thrust that is applied to a number of plates that are activated by the corresponding vertical cylinders on which a section linked to the shafts of such rollers is supported, shafts that are mounted with rotary freedom and connected, by means of respective arms, to the aforementioned plates, activatable for their depression and with that obtaining the central pivoting of both conveyor belts, which, as has already been said, will cause the separation of the two blocks that form the stacked sheets placed on the belt conveyors.

Finally, to state that the pivoting system described is supplemented with means capable of absorbing the small horizontal movements that take place after the mobile frames are depressed, these means being formed by a number of pulley wheels that slip along small boxes established for this purpose in the four corners of the actual moveable frames, this mechanism being activatable by central small cylinders or pistons.

The above-mentioned separator, in addition to the advantages and particularities already described, solves certain problems and disadvantages, among which the following can be mentioned:

Adjustment in the direction of forward movement of the anchoring plates established in the upper part of the machine.

It is not necessary that the joining points be small, by virtue of the fact that the separation and cutting of these joining points is easily carried out as a consequence of the central pivoting and in an ascending direction of both belt conveyors, all of which permits that the punching machine could work at full performance.

Notable piling height, with both blocks to be separated tilting, one towards each side.

The possibility of working the conveyor belts in both directions, in addition to having the advantage of that its activation is carried out by means of independent servomotors.

The possibility of adjustment of the anchoring plates in the direction of forward movement in order to be able to carry out the separation of blocks whose sectors have complex shapes.

Upwards pivoting of the belt conveyors, without it implying any breakage of the transport line.

Possibility of using a single separator for all machine models.

DESCRIPTION OF THE DRAWINGS

To supplement the description that is being carried out, and with the aim of leading to a better understanding of the characteristics of the invention, in agreement with a preferred example of its practical embodiment, as an integral part of said description it is accompanied by a game of drawings where in an illustrative and not limiting way, the following have been represented.

PREFERABLE EMBODIMENT OF THE INVENTION

In view of the above-mentioned figures, it can be seen that the separator of the invention has a general framework in which a lower fixed structure (1) and an upper structure formed by two mobile frames (2) and (2') is established, so that the structure (1) is formed by crossbars, crosspieces and stiffening intermediate parts, forming an enclosure for different components, whereas the upper mobile frames (2) and (2') have a triangular profile joined by crossbars, forming twin assemblies, near and parallel to each other, between which respective incoming and outgoing conveyor belts (3) and (3') for the piles of punched sheets pass, as will be expounded hereinafter.

Figure 1:
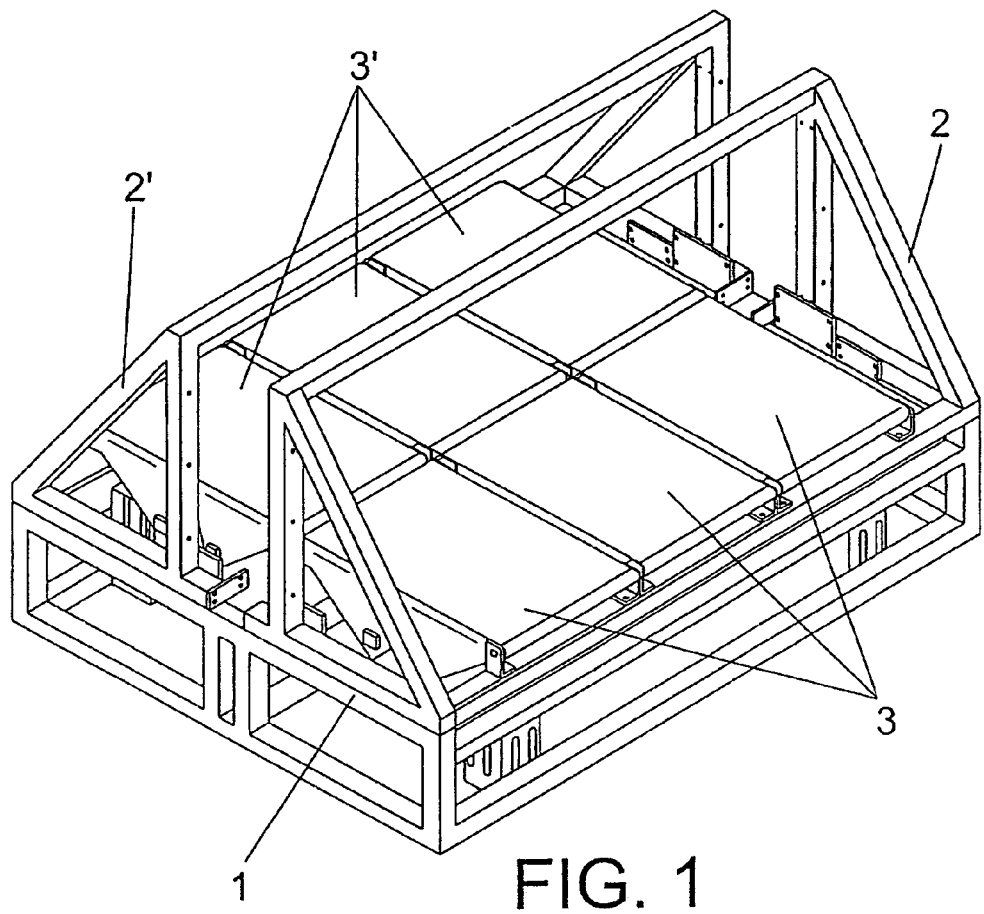
FIG. 1.—Shows a perspective view of the stacked sheets separator, carried out in accordance with the object of the invention; a separator in which the corresponding conveyor belts can be seen, although it is lacking the pressure mechanisms.
Figure 2:
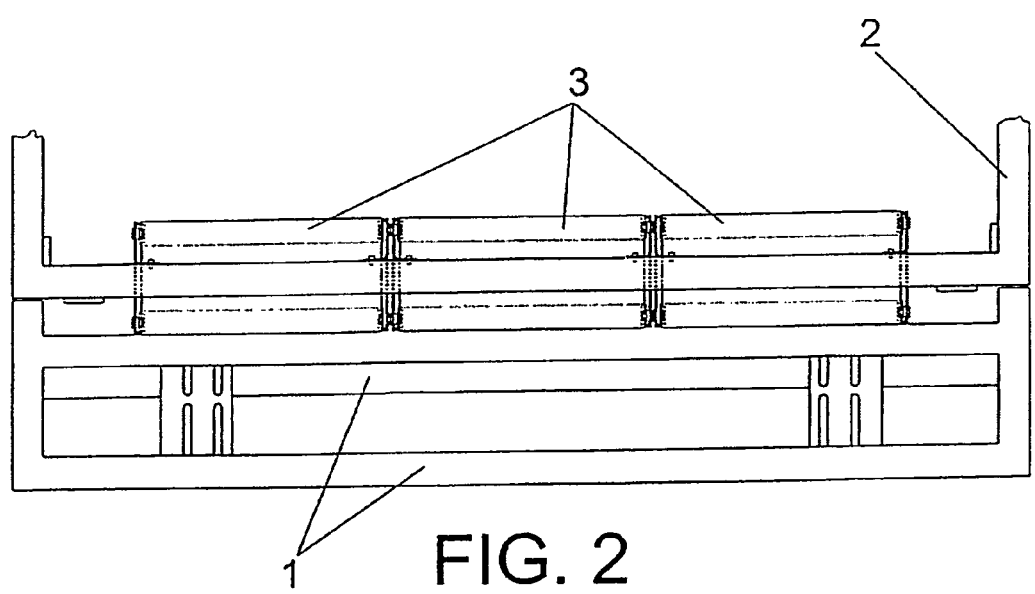
FIG. 2.—Shows a side elevation view of the lower fixed structure with the conveyor belts.
Figure 3:
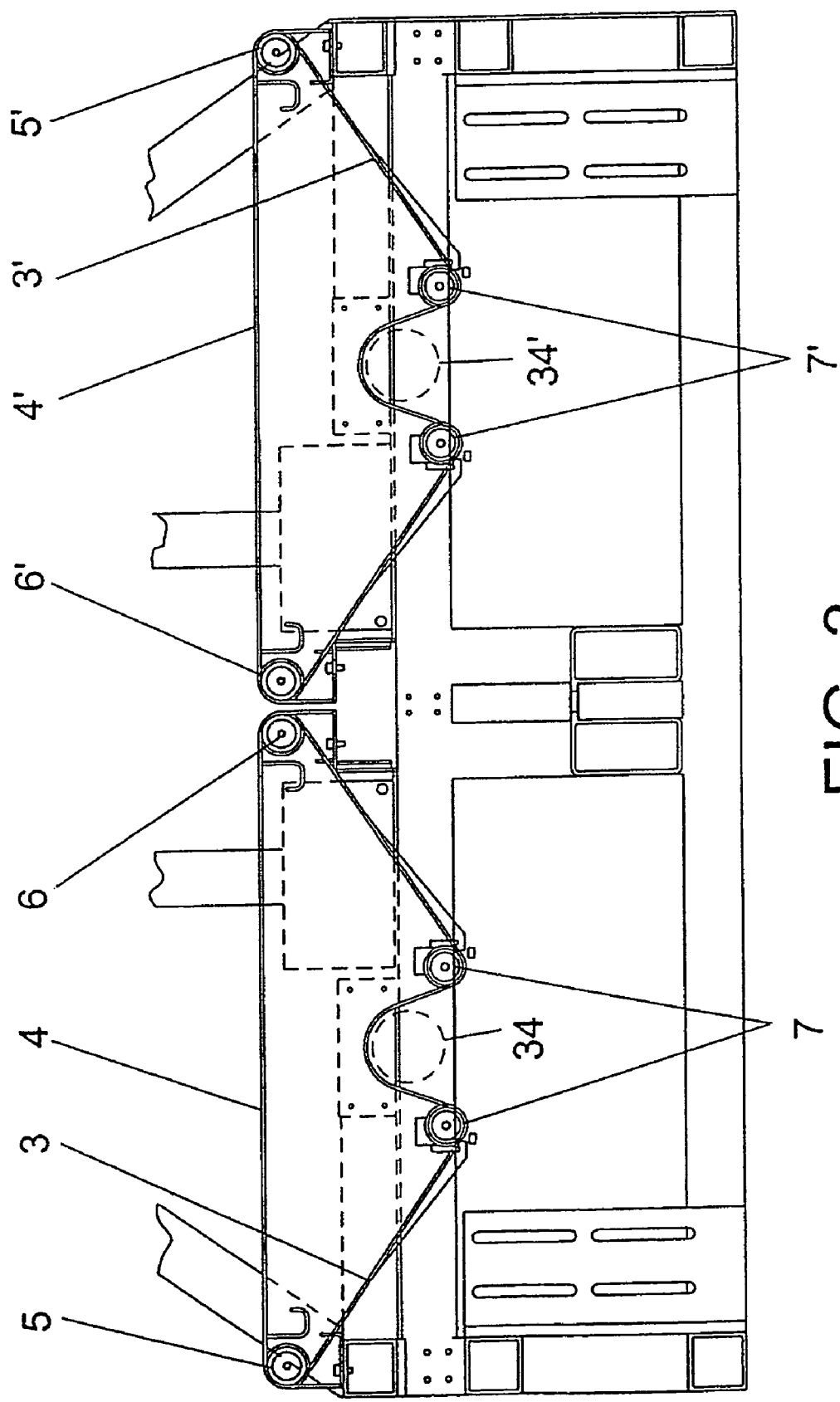
FIG. 3.—Shows a profile view corresponding to the A-A section line of FIG. 2, the mounting of both conveyor belts between the corresponding rollers, both drive and interior or pivoting, and exterior or fixed, being seen.
Figure 4:
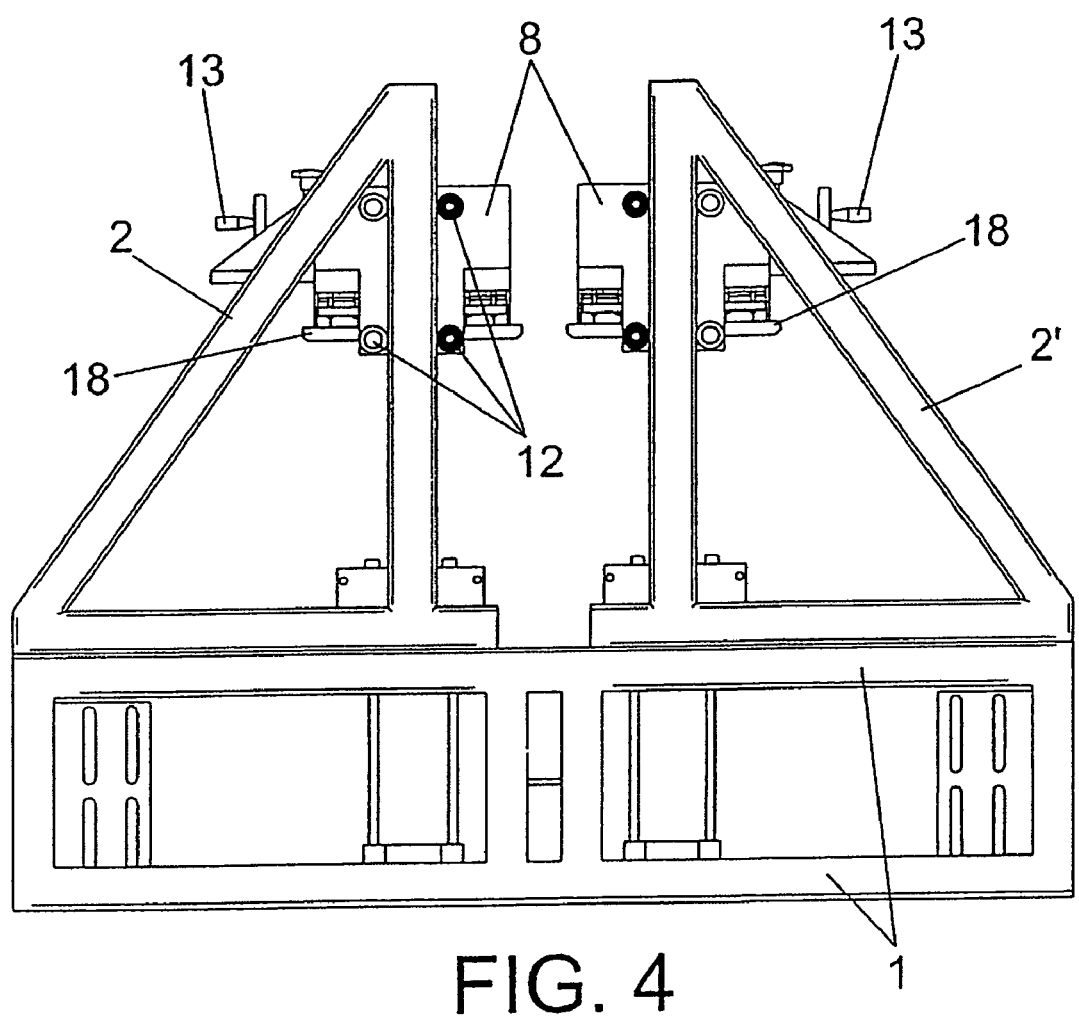
FIG. 4.—Shows a side view of the separator assembly, in which the lower fixed structure, the upper mobile frames and the pressure mechanisms, can be seen.
Figure 5:
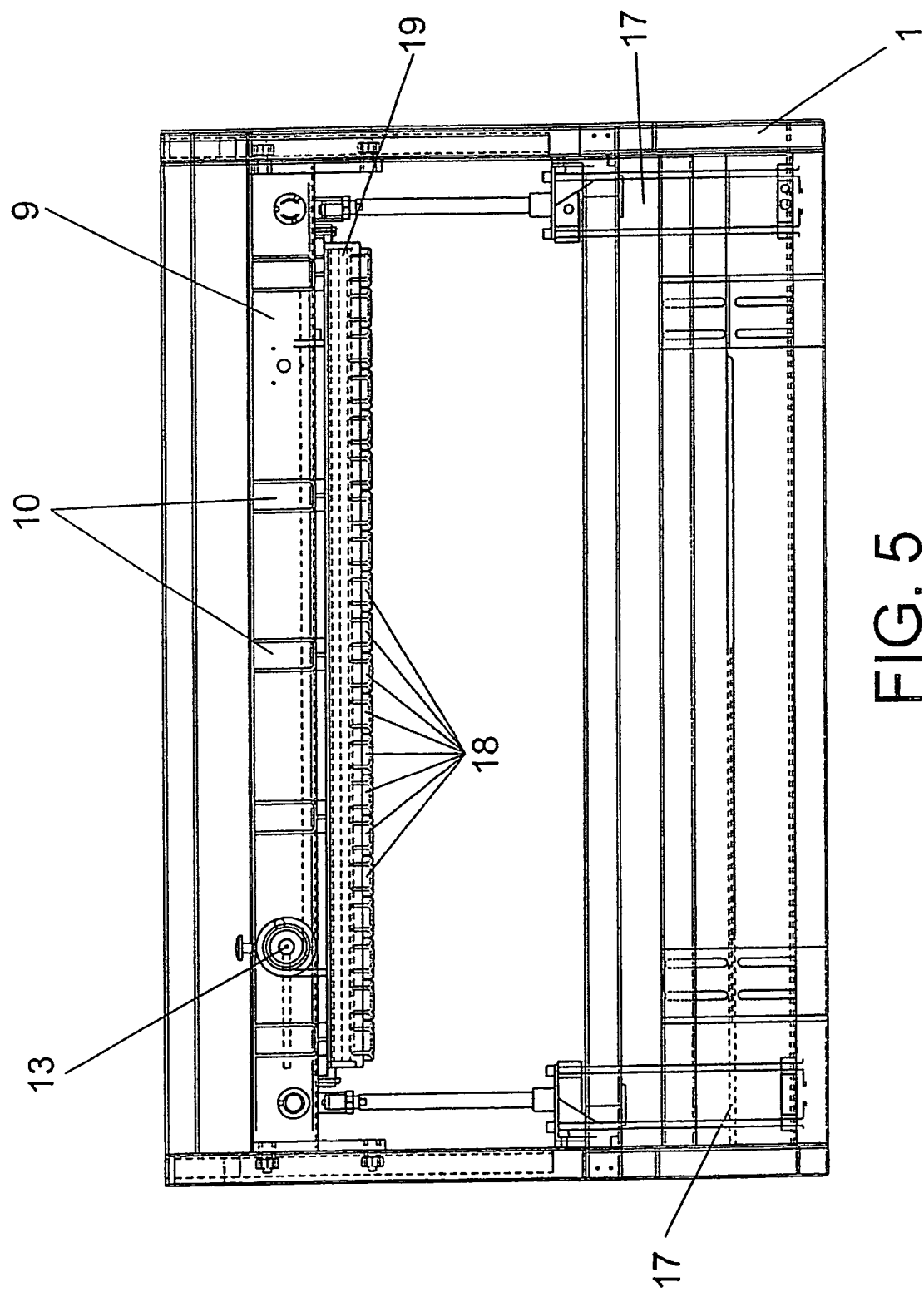
FIG. 5.—Shows a profile view of that shown in the previous figure.
Figure 6:
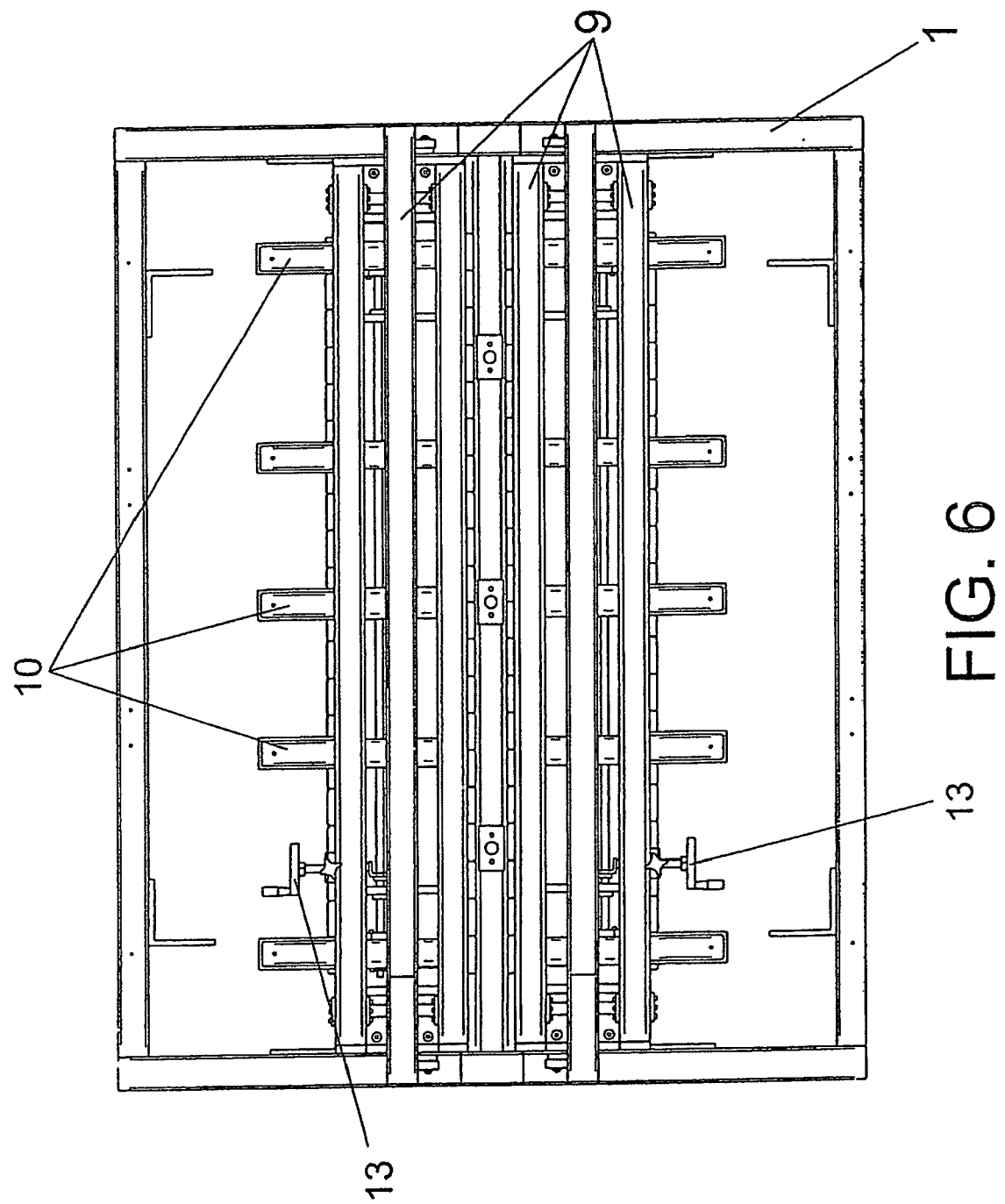
FIG. 6.—Shows a plan view corresponding to the assembly shown in FIGS. 4 and 5.
Figure 7:
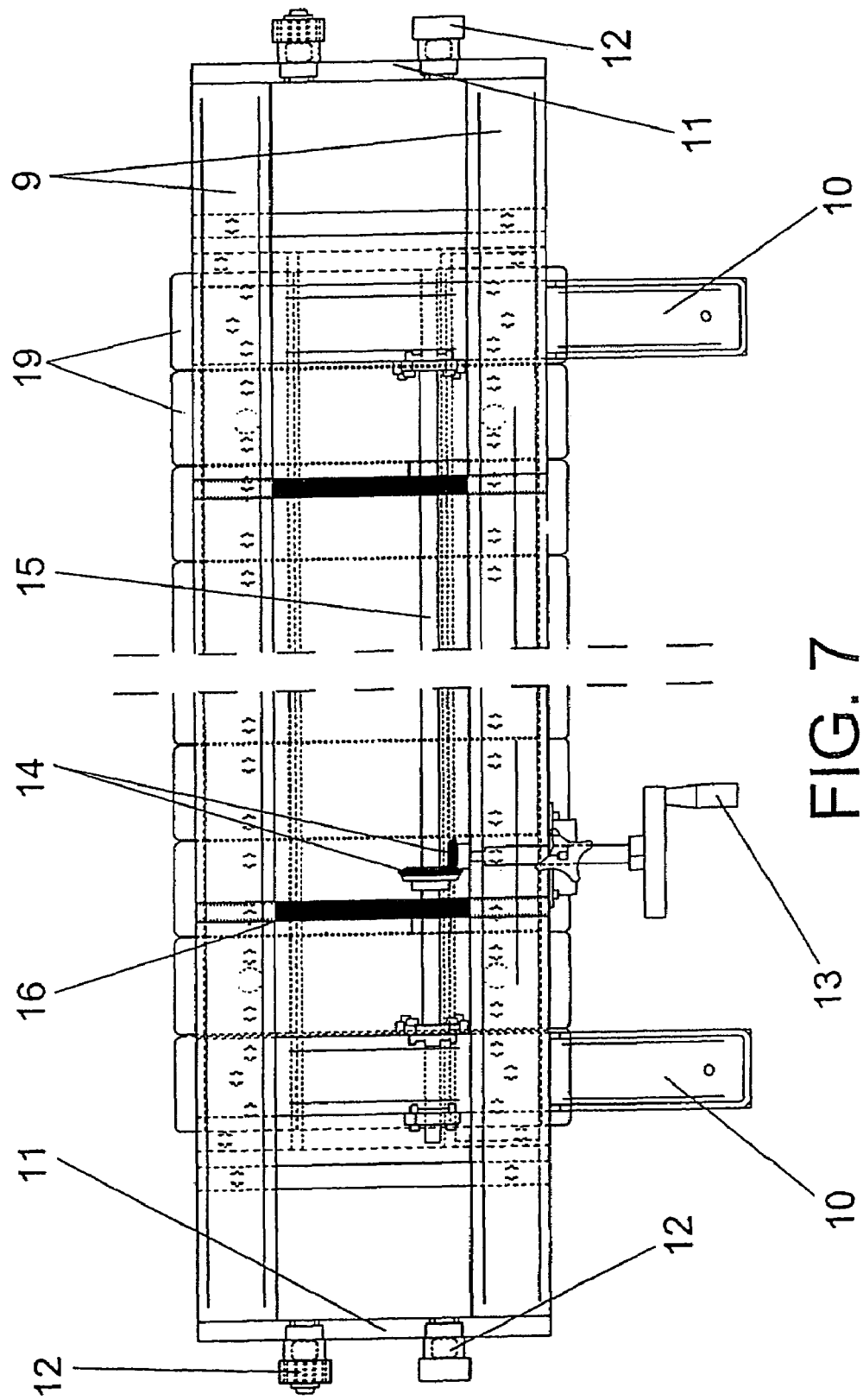
FIG. 7.—Shows a plan view of part of the pressure mechanism.
Figure 8:
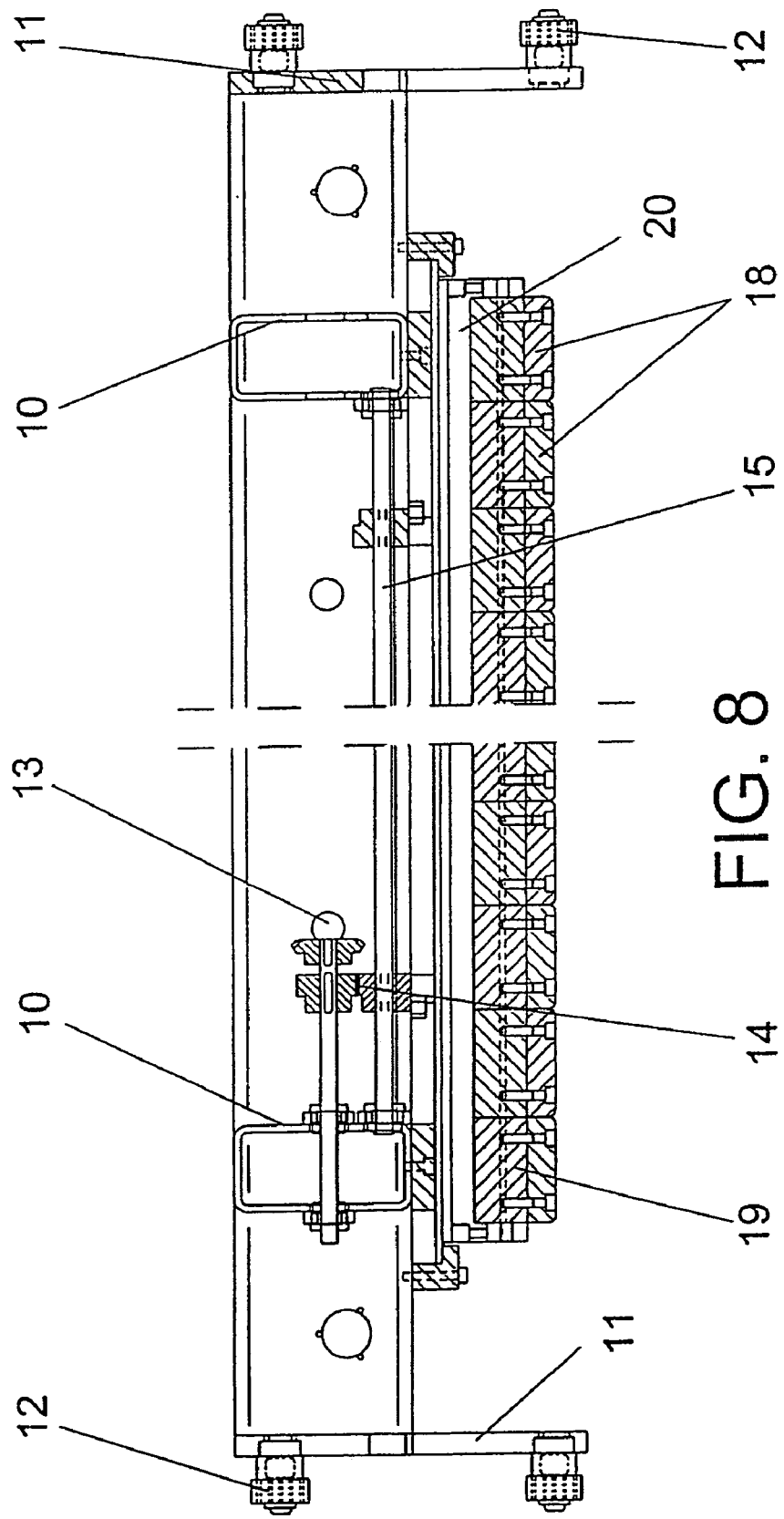
FIG. 8.—Shows a profile view, with a section cutaway, of the assembly shown in the previous figure.

Said conveyor belts (3) and (3'), in correspondence with these incoming and outlet areas, pass supported on corresponding sheets or slabs (4) and (4'), placed in a lower plane for said bands (3) and (3'), so that in the elbowed ends of these sheets or slabs (4-4') corresponding external rollers (5) and (5'), as well as corresponding internal rollers (6) and (6'), are placed, so that the belt conveyor (3) passes between the rollers (5) and (6) and the belt conveyor (3') passes between the rollers (5') and (6'), as well as through another pair of tensing rollers (7) and (7'), placed at a lower level, between which a friction shaft (34) and (34') is placed, as elements for drive and traction by friction of the actual belts (3) and (3'), as can be clearly seen in FIG. 3, where also it can be seen how the interior rollers (6) and (6') are near and parallel to each other, so that through these rollers the actual conveyor belts will tilt upwards to carry out the separation that is required.

Twin devices or pressure mechanisms (8) are mounted on the frames (2) and (2'), intended to exert pressure on the group of stacked sheets (31), with the corresponding pre-cut lines established in these, shown in FIGS. 13a to 13f, and that accede to the separating assembly.

Said pressure mechanisms (8) are formed in each case from a number of frames (9) connected by means of crossbars (10), those being joined by their ends by means of respective plates (11) in which pairs of rollers (12) are mounted, as guiding elements in the movements to which those will be submitted. The crossbars (10) are supplemented by a device that can be activated to bring about longitudinal movement with respect to the frames (9), the device being formed by a manually activated handle (13) that transmits, through a set of gears (14), the rotation to a shaft (15) to which the crossbars (10) are integrally attached, all of this in combination with a slide fastener (16).

This assembly that the frames (9) with the crossbars (10) form, is joined at its ends to a number of hydraulic pistons (17), that, on been activated, bring about the vertical displacement of a number of retaining pads (18), provided in supports of the actual device or pressure mechanism, these supports being formed by wooden blocks placed in a longitudinal direction, and that are referenced by the number (19), associated with an air chamber at pressure (20) that acts as cushion or damping of the actual retaining pads (18).

When both pressure mechanisms (8), provided in the upper part of the mobile frames (2) and (2'), are activated they move downwards and catch the block composed of sheets of cardboard stacked and punched.

Figure 9:
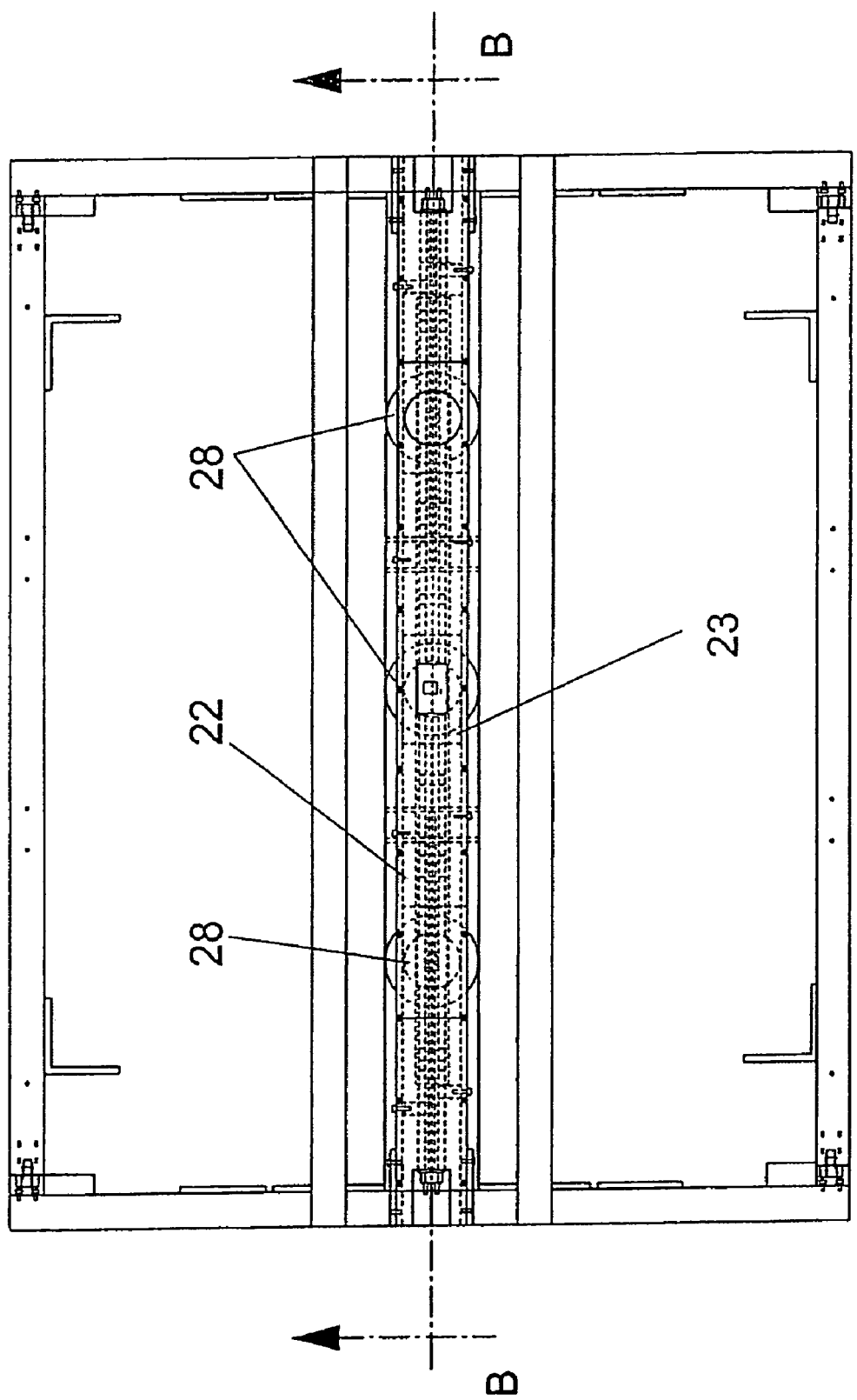
FIG. 9.—Shows a plan view of the pivoting mechanism placed in correspondence with the central line or band of the separator.
Figure 10:
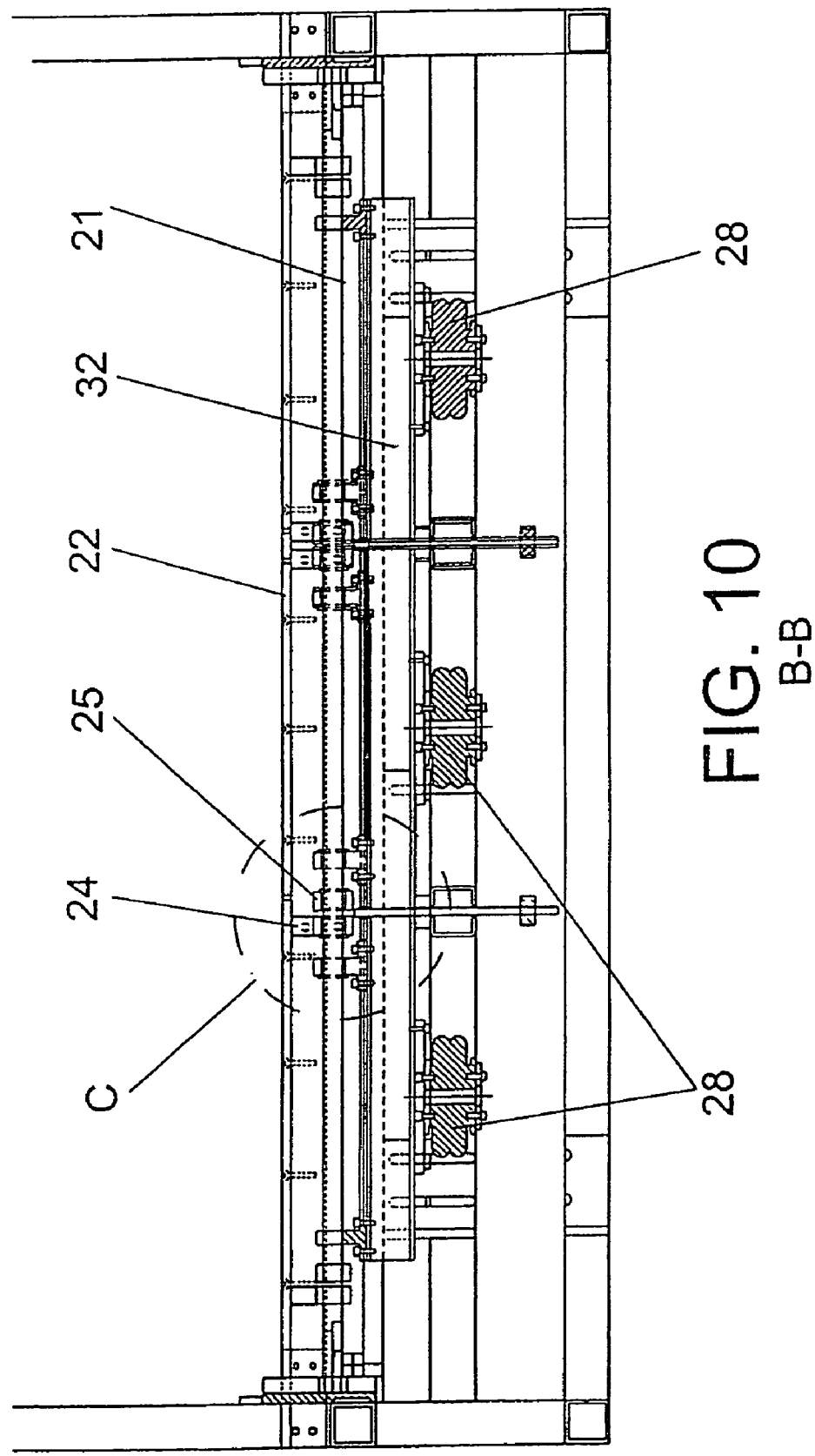
FIG. 10.—Shows a section view corresponding to the B-B section line of the previous figure.
Figure 11:
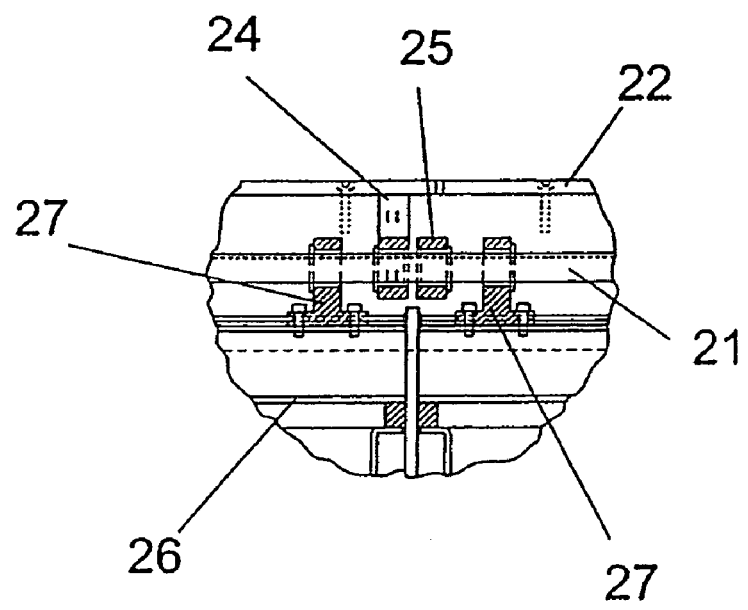
FIG. 11.—Shows the detail marked C of FIG. 10.
Figure 12:
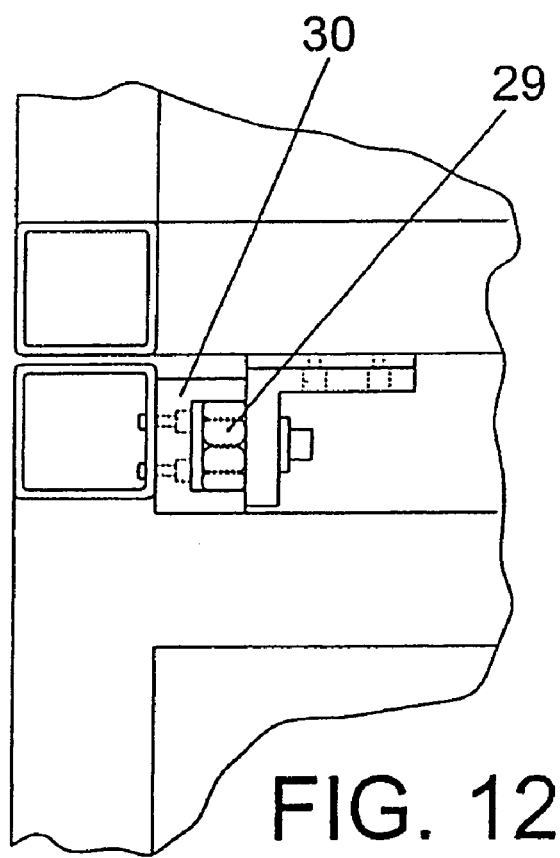
FIG. 12.—Shows a detail corresponding to the mechanism established in each of the four corners of the separator, to resolve the small horizontal movements.

In addition, in FIGS. 9, 10 and 11 the pivoting system for each of two groups of conveyor belts (3) and (3'), and of course for the plates (4-4') that support said belts, can be seen.

Specifically, the axle (21) of the rollers (6) and (6') is supported, with ability to rotate in each case, on the plates (22) and (23), by means of the arms (24) and (25). Likewise, the shaft (21) of both rollers (6) and (6') is supported, in each case, on a section (26), by means of the arms (27), with ability to freely rotate, and which section (26) rests on different vertical cylinders (28), of short stroke, which, on been activated, move the rollers (6) and (6') of the conveyor belts (3) and (3') upwards, depressing the plates (22) and (23) at the opposite angle, so that the mobile frames (2) and (2') are also depressed, because the rollers (6) and (6'), as well as the external rollers (5) and (5') are supported at their ends in the mobile frames (2) and (2') referred to.

It is necessary to bear in mind that, on both frames (2) and (2') being folded upwards and centrally, their rotation will be in the corresponding external edges, whereas in four corners of the said edges pulley wheels (29) that slide in small boxes (30), in the shape of a "C", fixed to the lower face of the crossbars corresponding to the mobile frames (2) and (2'), have been provided; so that the mechanism that these pulley wheels (29), provided in four corners, form between the fixed structure and in each of the mobile frames, is intended to absorb the small horizontal movements that take place after the mobile frames (2) and (2') are depressed by the action of the central small cylinders or pistons (28).

Figure 13A:
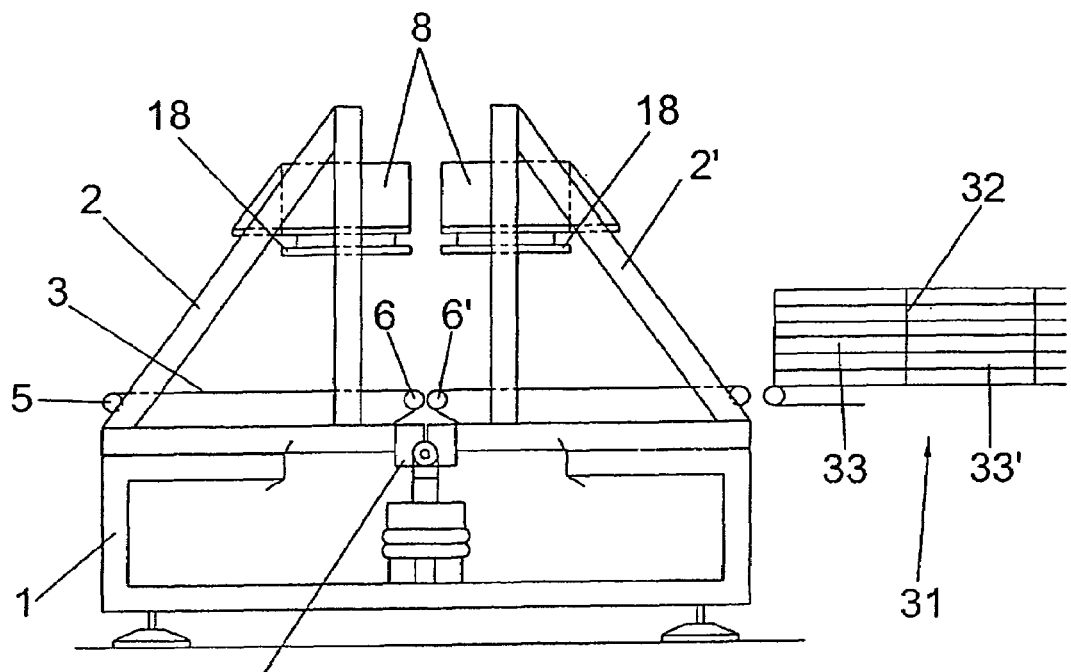
FIGS. 13a, 13b, 13c, 13d, 13e and 13f.—Correspond to a number of other side elevation schematic views of the separator, according to its different operative phases.

The sequence of operation shown in the FIGS. 13$^a$-13f is as follows:

FIG. 13a shows the position in which the stacked sheets (31), with the pre-cut line (32) in all of them delimiting sectors and therefore blocks (33-33'), etc, are positioned the input of the separator.

Figure 13B:
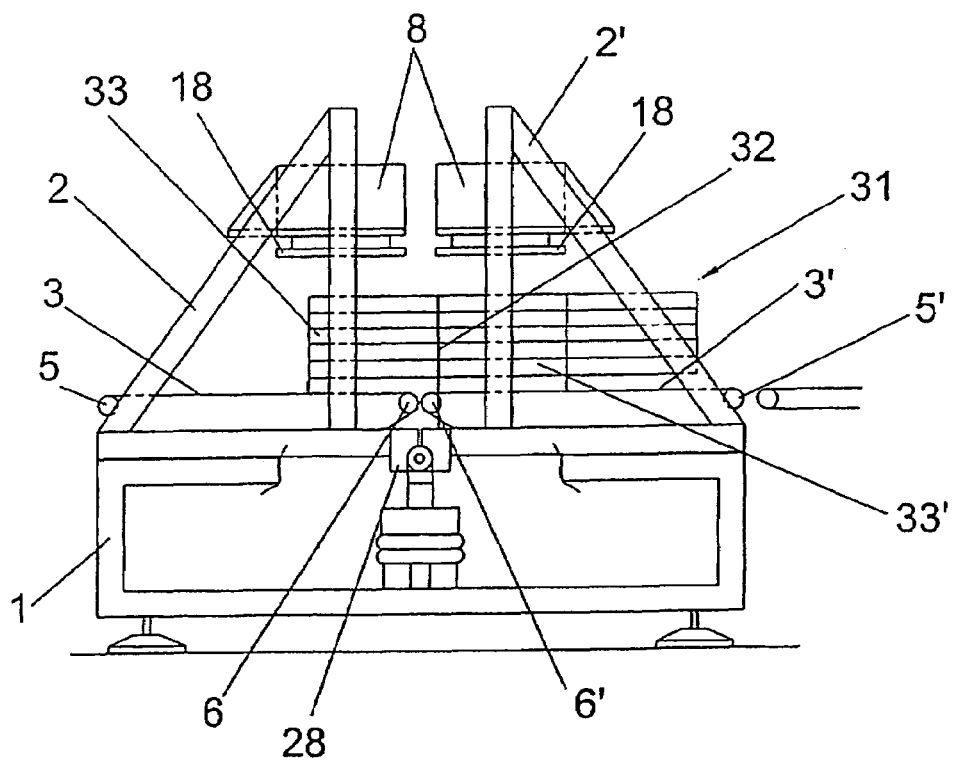

FIG. 13b shows how the block (33) of the group of sheets (31) is placed on the conveyor belt (3), whereas the block (33') of the same stacked sheets (31) is placed or remains placed on the conveyor belt (3'), while the pre-cut line (32) is placed in the area of separation, that is, between both interior rollers (6) and (6') of two conveyor belts (3) and (3').

Figure 13C:
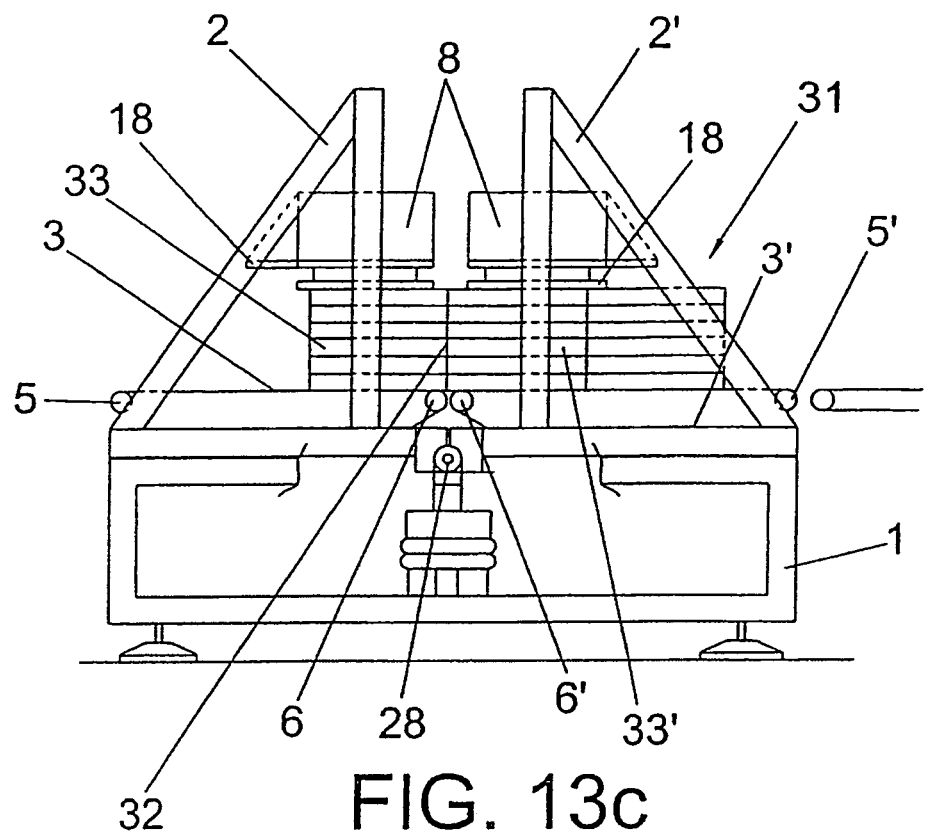

In that position, and as is shown in FIG. 13c, the pressure mechanisms (8) act lowering and positioning the retaining pads (18) on both blocks (33) and (33'), pressing on them to effect their immobilisation and correct anchoring.

Figure 13D:
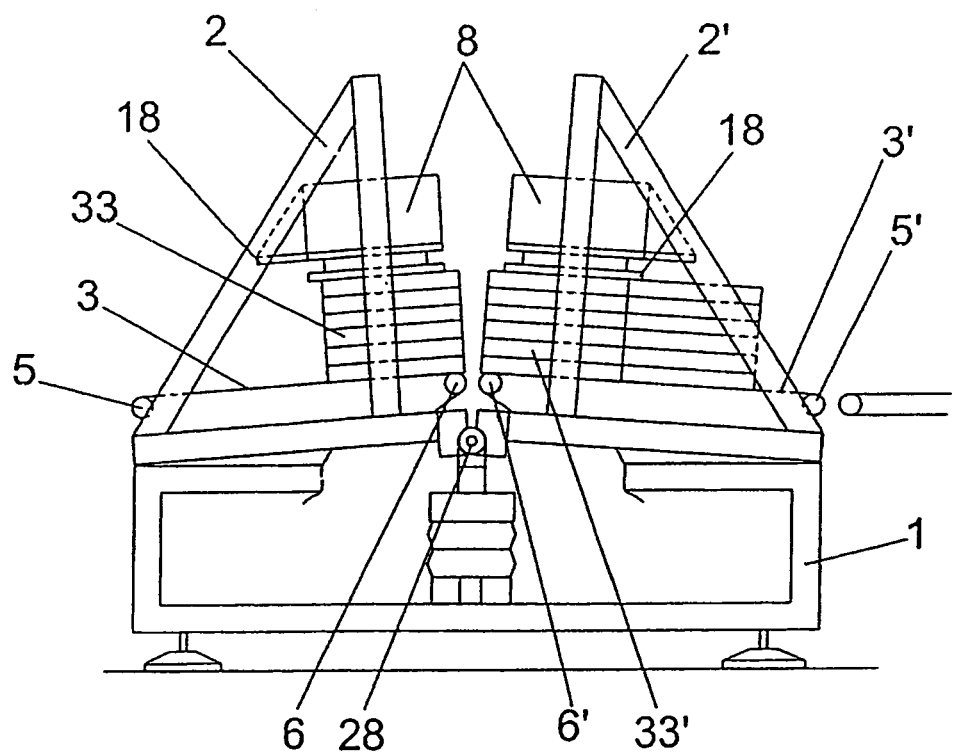

In that position and as is shown in FIG. 13d, the pivoting mechanism is acted on, making the conveyor belts (3) and (3') pivot upwards, through their interior shafts (6) and (6'), it being seen how the separation of the blocks (33) and (33') of the stacked sheets (31) is carried out, producing separation by rupture of the corresponding punched line (32).

Figure 13E:
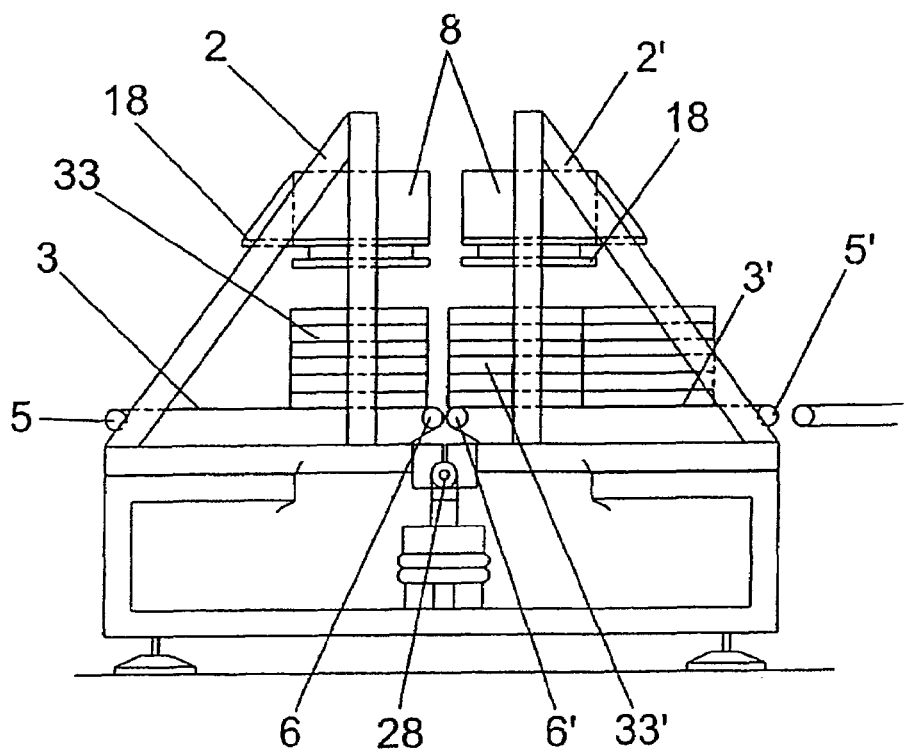
Figure 13F:
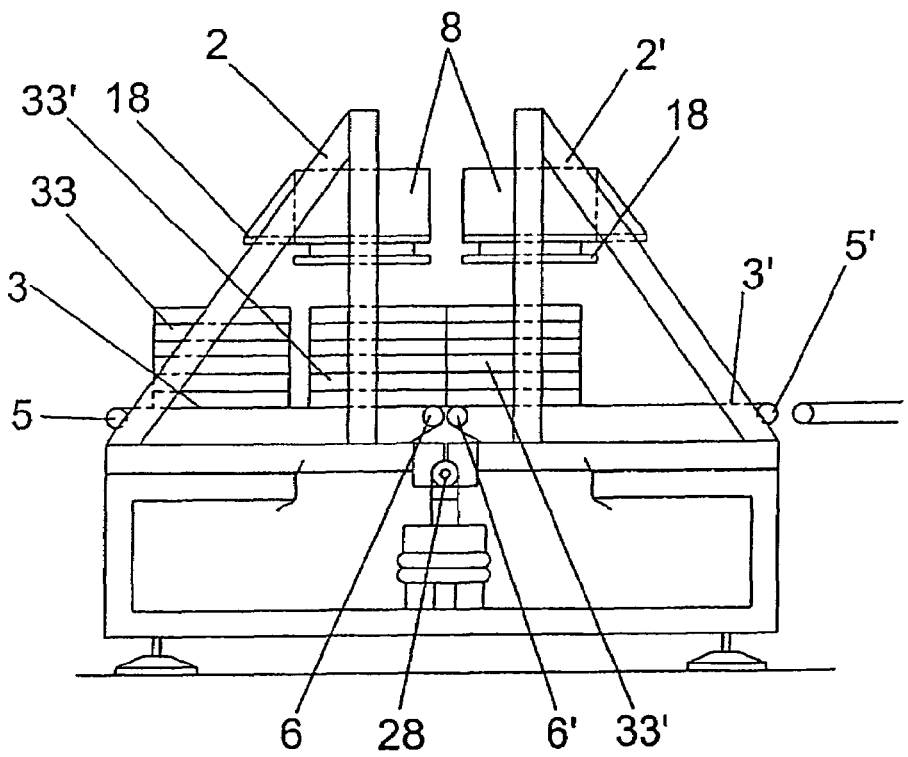

In FIG. 13e, the mobile frames (2) and (2') return to their original position, as well as the pressure mechanisms (8), with which the transport belt (3) can carry away the now separated block (33), at the same time that the block (33') has been placed on the same transport belt (33), for the following to be separated in the way that has been previously said.

The invention claimed is:

1. A separator of stacked sheets, where the sheets are provided as blocks of stacked sheets, the blocks delimited by corresponding pre-cut lines positioned such that each sector of these blocks forms a cardboard box, the separator comprising:

first and second conveyor belts mounted on corresponding first and second moveable frames, operable to tilt centrally and upwards to obtain separation between sheets, along the pre-cut lines of the blocks which are positioned on the first and second conveyor belts, with the pre-cut lines positioned in a central area established between both belts where first and second internal rollers are mounted, such that, in combination with first and second external rollers and tensing and lower rollers, means of support and movement for the first and second conveyor belts are formed, the conveyor belts driven by corresponding first and second traction rollers set up between the first and second tensing and lower rollers with first and second cylinders positioned centrally beneath the internal rollers such that activation of the first and second cylinders raises and upwardly pivots the first and second mobile frames, the first and second conveyor belts and the first and second internal rollers with the external rollers remaining static.

2. The separator according to claim 1, wherein twin pressure mechanisms are placed on the first and second mobile frames and are mounted on a lower fixed structure, the twin pressure mechanisms being operable to move in an upwards and downwards direction, such that when moving downwards the twin pressure mechanisms press through first and second lower retaining pads, positioned onto a top surface of the blocks of stacked sheets.

3. The separator according to the claim 2, wherein the first and second retaining pads are mounted on support blocks joined with a damping chamber.

4. The separator according to claim 3, wherein the twin pressing mechanisms each have a frame and crossbeams those fitted with side plates and end plates with guide rollers enabling upwards and downwards movements of the actual pressing mechanisms, such that the crossbeams are mounted with freedom of movement with respect to the frame, after prior activation of a handle associated with a gear mechanism and slide fastener to allow movement of said crossbeams and corresponding positioning thereof to adapt themselves to different formats of blocks to be separated.

5. The separator according to claim 1, wherein corresponding shafts of each of the first and second internal rollers of the first and second conveyor belts, are associated with first and second plates through first and second arms, such that each shaft of each of the internal rollers is rotatably supported on a section by means of third arms wherein the section is activated by means of the first and second cylinders to carry out the ascending movement of the first and second rollers along with the moveable frames to obtain the separation between sheets, along the pre-cut lines of the blocks placed on both conveyor belts.

6. The separator according to the claim 5, further comprising pulley wheels positioned at each corner of the first and second mobile frames pulley wheels arranged to slide in corresponding small boxes fixed to the actual moveable frames and allowing small horizontal movements, originating from upwards folding of the actual mobile frames to be absorbed.

* * * * *